United States Patent
Miller et al.

(10) Patent No.: US 11,098,647 B2
(45) Date of Patent: *Aug. 24, 2021

(54) THERMAL MANAGEMENT SYSTEM

(71) Applicant: General Electric Company, Schenectady, NY (US)

(72) Inventors: Brandon Wayne Miller, Liberty Township, OH (US); Duane Howard Anstead, Fairfield, OH (US); Mohammed El Hacin Sennoun, West Chester, OH (US); Ning Fang, Mason, OH (US); Kyle Robert Snow, Loveland, OH (US)

(73) Assignee: General Electric Company, Schenectady, NY (US)

( * ) Notice: Subject to any disclaimer, the term of this patent is extended or adjusted under 35 U.S.C. 154(b) by 85 days.

This patent is subject to a terminal disclaimer.

(21) Appl. No.: 16/256,629

(22) Filed: Jan. 24, 2019

(65) Prior Publication Data

US 2019/0153954 A1 May 23, 2019

Related U.S. Application Data

(63) Continuation of application No. 15/041,224, filed on Feb. 11, 2016, now Pat. No. 10,215,097, which is a (Continued)

(51) Int. Cl.
*F02C 7/00* (2006.01)
*F02C 7/224* (2006.01)
(Continued)

(52) U.S. Cl.
CPC .............. *F02C 7/224* (2013.01); *B64D 27/12* (2013.01); *B64D 37/02* (2013.01); *B64D 37/34* (2013.01);
(Continued)

(58) Field of Classification Search
CPC .... F02C 7/224; F02C 7/06; F02C 7/14; F02C 7/236; F05D 2220/764; F05D 2220/32; (Continued)

(56) References Cited

U.S. PATENT DOCUMENTS 3,483,129 A 12/1969 Dolle, Jr.
4,041,697 A 8/1977 Coffinberry et al.
(Continued)

FOREIGN PATENT DOCUMENTS

CN 103089446 A 5/2013
EP 1329617 A2 7/2003
(Continued)

OTHER PUBLICATIONS

Canadian Office Action Corresponding to Application No. 2950792 dated Nov. 28, 2017.
(Continued)

*Primary Examiner* — Todd E Manahan
*Assistant Examiner* — Edwin Kang
(74) *Attorney, Agent, or Firm* — Dority & Manning, P.A.

(57) ABSTRACT

A system for managing thermal transfer in at least one of an aircraft or a gas turbine engine includes a first engine system utilizing an oil for heat transfer. The oil of the first system has a temperature limit of at least about 500° F. The system additionally includes a fuel system having a deoxygenation unit for deoxygenating fuel in the fuel system, as well as a fuel-oil heat exchanger located downstream of the deoxygenation unit. The fuel-oil heat exchanger is in thermal communication with the oil in the first engine system and the fuel in the fuel system for transferring heat from the oil in the first engine system to the fuel in the fuel system.

17 Claims, 6 Drawing Sheets

Related U.S. Application Data continuation of application No. 14/962,313, filed on Dec. 8, 2015, now abandoned.

(51) Int. Cl.
| | |
|---|---|
| *F02C 7/06* | (2006.01) |
| *F02C 7/14* | (2006.01) |
| *B64D 37/02* | (2006.01) |
| *B64D 37/34* | (2006.01) |
| *B64D 27/12* | (2006.01) |
| *F02C 7/236* | (2006.01) |

(52) U.S. Cl.
CPC ............... *F02C 7/06* (2013.01); *F02C 7/14* (2013.01); *F02C 7/236* (2013.01); F05D 2220/32 (2013.01); F05D 2220/764 (2013.01); F05D 2240/35 (2013.01); F05D 2260/20 (2013.01); F05D 2260/205 (2013.01); F05D 2260/213 (2013.01); F05D 2260/98 (2013.01); Y02T 50/60 (2013.01)

(58) Field of Classification Search
CPC ............. F05D 2240/35; F05D 2260/20; F05D 2260/205; F05D 2260/213; F05D 2260/98; B64D 37/34
See application file for complete search history.

(56) References Cited

U.S. PATENT DOCUMENTS

| | | | |
|---|---|---|---|
| 4,373,325 A | | 2/1983 | Shekleton |
| 4,452,037 A | * | 6/1984 | Waddington ............ F01D 25/18 |
| | | | 184/6.11 |
| 6,415,595 B1 | | 7/2002 | Wilmot, Jr. et al. |
| 6,939,392 B2 | | 9/2005 | Huang et al. |
| 7,329,305 B2 | | 2/2008 | Sloan |
| 7,377,112 B2 | | 5/2008 | Spadaccini et al. |
| 7,431,818 B2 | | 10/2008 | Cipollini |
| 7,435,283 B2 | | 10/2008 | Tillman et al. |
| 7,465,335 B2 | | 12/2008 | Schmidt |
| 7,465,336 B2 | | 12/2008 | McHugh |
| 7,569,099 B2 | | 8/2009 | Coffin et al. |
| 7,582,137 B2 | | 9/2009 | Chen et al. |
| 7,601,203 B2 | | 10/2009 | Reeve et al. |
| 7,615,104 B2 | | 11/2009 | Cordatos et al. |
| 7,824,470 B2 | | 11/2010 | Chiappetta et al. |
| 8,177,884 B2 | | 5/2012 | Schmidt et al. |
| 8,205,427 B2 | | 6/2012 | Schwarz et al. |
| 8,261,527 B1 | | 9/2012 | Stearns et al. |
| 8,534,044 B2 | | 9/2013 | Smith |
| 8,656,722 B2 | | 2/2014 | Norris et al. |
| 8,741,029 B2 | | 6/2014 | Cordatos et al. |
| 8,776,952 B2 | | 7/2014 | Schwarz et al. |
| 8,876,946 B2 | | 11/2014 | Jalbert |
| 9,051,056 B2 | | 6/2015 | Leese |
| 9,120,580 B2 | | 9/2015 | Sampath |
| 10,215,097 B2 | * | 2/2019 | Miller .................... B64D 37/02 |
| 2004/0189108 A1 | * | 9/2004 | Dooley .................... H02K 1/02 |
| | | | 310/52 |
| 2004/0194627 A1 | | 10/2004 | Huang et al. |
| 2005/0155353 A1 | * | 7/2005 | Sabatino .................. F02C 7/22 |
| | | | 60/772 |
| 2007/0006591 A1 | | 1/2007 | Spadaccini et al. |
| 2007/0154891 A1 | | 7/2007 | Cha |
| 2007/0264133 A1 | | 11/2007 | Schwarz et al. |
| 2008/0028763 A1 | | 2/2008 | Schwarz et al. |
| 2008/0110596 A1 | | 5/2008 | Schwarz et al. |
| 2008/0173003 A1 | | 7/2008 | Chen |
| 2008/0250792 A1 | | 10/2008 | Wang et al. |
| 2009/0176956 A1 | | 7/2009 | Grinstaff et al. |
| 2011/0023483 A1 | | 2/2011 | Berger et al. |
| 2013/0086909 A1 | * | 4/2013 | Wang ....................... F02C 7/14 |
| | | | 60/730 |
| 2013/0186100 A1 | | 7/2013 | Rhoden et al. |
| 2014/0090395 A1 | | 4/2014 | Appukuttan et al. |
| 2015/0125264 A1 | | 5/2015 | Lighty et al. |
| 2015/0232777 A1 | | 8/2015 | Qu et al. |
| 2016/0347670 A1 | * | 12/2016 | Schmidt ................ C04B 35/597 |

FOREIGN PATENT DOCUMENTS

| | | |
|---|---|---|
| EP | 1557357 A2 | 7/2005 |
| EP | 1723996 B1 | 9/2012 |
| EP | 1736652 B1 | 2/2013 |
| EP | 2540366 A3 | 3/2013 |
| EP | 1775514 B1 | 5/2013 |
| EP | 1782879 B1 | 6/2013 |
| EP | 2617649 A2 | 7/2013 |
| EP | 1731209 B1 | 12/2013 |
| EP | 1908506 B1 | 4/2014 |
| EP | 2713027 A2 | 4/2014 |
| EP | 1918424 B1 | 8/2014 |
| JP | 2003/262135 A | 9/2003 |
| JP | 2005/207416 A | 8/2005 |
| JP | 2007/003184 A | 1/2007 |
| JP | 2007/505260 A | 3/2007 |
| JP | 2007/154891 A | 6/2007 |
| JP | 2007/303470 A | 11/2007 |
| WO | WO2015/050579 A2 | 4/2015 |

OTHER PUBLICATIONS

Chinese Office Action and Search Report Corresponding to Application No. 201611121779 dated Dec. 20, 2017.
European Office Action Corresponding to Application No. 16201914 dated Nov. 26, 2019.
European Search Report Corresponding to Application No. 16201914 dated Apr. 24, 2017.
Indian Office Action Corresponding to Application No. 201644041617 dated Jul. 17, 2019.
Machine Translated Japanese Office Action Corresponding to Application No. 2016233755 dated Nov. 28, 2017.
Machine translated Japanese Search Report Corresponding to Application No. 2016233755 dated Nov. 27, 2017.
Jin C-M et al, "Polyethylene glycol functionalized dicationic ionic liquids with alkyl or polyfluoroalkyl substituents as high temperature lubricants" Journal of Material Chemistry, Royal Society of Chemistry vol. 16, GB, Feb. 6, 2006, pp. 1529-1535.
Yokoyama, "Estimation of Service Lives and Operating temperature Ranges of High-Temperature Lubrication Oils Using Thermal Analysis" Journal of Physical Science and Application, Jan. 1, 2014, pp. 516-523.

* cited by examiner

THERMAL MANAGEMENT SYSTEM

PRIORITY INFORMATION

The present application claims priority to, and is a continuation of, U.S. patent application Ser. No. 15/041,224 titled "Thermal Management System" filed on Feb. 11, 2016, which in turn claims priority to, and is a continuation of, U.S. patent application Ser. No. 14/962,313 titled "Thermal Management System" filed on Dec. 8, 2015, each of these applications are incorporated by reference herein.

FIELD OF THE INVENTION

The present subject matter relates generally to a thermal management system for at least one of an aircraft and a gas turbine engine.

BACKGROUND OF THE INVENTION

A gas turbine engine generally includes a fan and a core arranged in flow communication with one another. The core of the gas turbine engine generally includes, in serial flow order, a compressor section, a combustion section, a turbine section, and an exhaust section. In operation, at least a portion of air over the fan is provided to an inlet of the core. Such portion of the air is progressively compressed by the compressor section until it reaches the combustion section. Fuel is mixed with the compressed air and burned within the combustion section to provide combustion gases. The combustion gases are routed from the combustion section through the turbine section to drive one or more turbines within the turbine section. The one or more turbines within the turbine section maybe coupled to one or more compressors of the compressor section via respective shaft(s). The combustion gases are then routed through the exhaust section, e.g., to atmosphere.

The gas turbine engines accordingly include a variety of rotating components, which may experience hot operating conditions—the hot operating conditions potentially limiting engine component life. Modern gas turbine engines employ sophisticated thermal management systems to cool these rotating components. Unfortunately, the commonly used thermal heat sinks may not provide a desired amount of heat removal.

At the same time, it desirable to heat fuel delivered to the combustion section of the gas turbine engine to increase an engine efficiency. Fuel temperature, however, may be limited by the formation of insoluble products referred to as "coke". Coke may form when hydrocarbon fuel containing oxygen is heated beyond a certain temperature (e.g. above 250° F. or 121° C.). Coke deposits may potentially limit fuel system component life.

Accordingly, a gas turbine engine capable of efficiently removing heat from various rotating components of the gas turbine engine while additionally heating fuel to be delivered to the combustion section of the gas turbine engine would be useful. More particularly, a gas turbine engine capable of efficiently removing heat from various rotating components of the gas turbine engine while additionally heating fuel to be delivered to the combustion section without forming Coke within such fuel would be especially beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a system for managing thermal transfer in at least one of an aircraft or a gas turbine engine is provided. The system includes a first engine system utilizing an oil for heat transfer, the oil having a temperature limit of at least about 500 degrees Fahrenheit ("F"). The system also includes a fuel system. The fuel system includes a deoxygenation unit for deoxygenating a fuel in the fuel system and a fuel-oil heat exchanger located downstream of the deoxygenation unit, the fuel-oil heat exchanger being in thermal communication with the oil in the first engine system and the fuel in the fuel system for transferring heat from the oil in the first engine system to the fuel in the fuel system.

In another exemplary embodiment of the present disclosure, a system for managing thermal transfer is provided. The system includes a gas turbine engine having a combustor, a first engine system operable with the gas turbine engine and utilizing an oil for heat transfer, and a fuel system for providing fuel to the combustor of the gas turbine engine. The fuel system includes a fuel tank, a fuel pump located downstream of the fuel tank for generating a flow of fuel, and a deoxygenation unit located downstream of the fuel pump for deoxygenating a fuel in the fuel system. The fuel system additionally includes a fuel-oil heat exchanger located downstream of the deoxygenation unit, the fuel-oil heat exchanger in thermal communication with the oil in the first engine system and the fuel in the fuel system for transferring heat from the oil in the first engine system to the fuel in the fuel system.

In yet another exemplary embodiment of the present disclosure, a system for managing thermal transfer is provided. The system includes a gas turbine engine and a main lubrication oil system operable with the gas turbine engine for providing the gas turbine engine with a lubrication oil. The lubrication oil has a temperature limit of at least about 500 degrees F. The system additionally includes a fuel system. The fuel system includes a deoxygenation unit for deoxygenating a fuel in the fuel system and a fuel-oil heat exchanger located downstream of the deoxygenation unit in thermal communication with the lubrication oil in the main lubrication oil system. The fuel-oil heat exchanger, during operation of the gas turbine engine, defines a fuel inlet temperature, a fuel outlet temperature, an oil inlet temperature, and an oil outlet temperature. The fuel inlet temperature is up to about 200 degrees F., the fuel outlet temperature is between about 450 degrees F. and about 600 degrees F., the oil inlet temperature is between about 450 degrees F. and about 600 degrees F., and the oil outlet temperature is up to about 250 degrees F.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
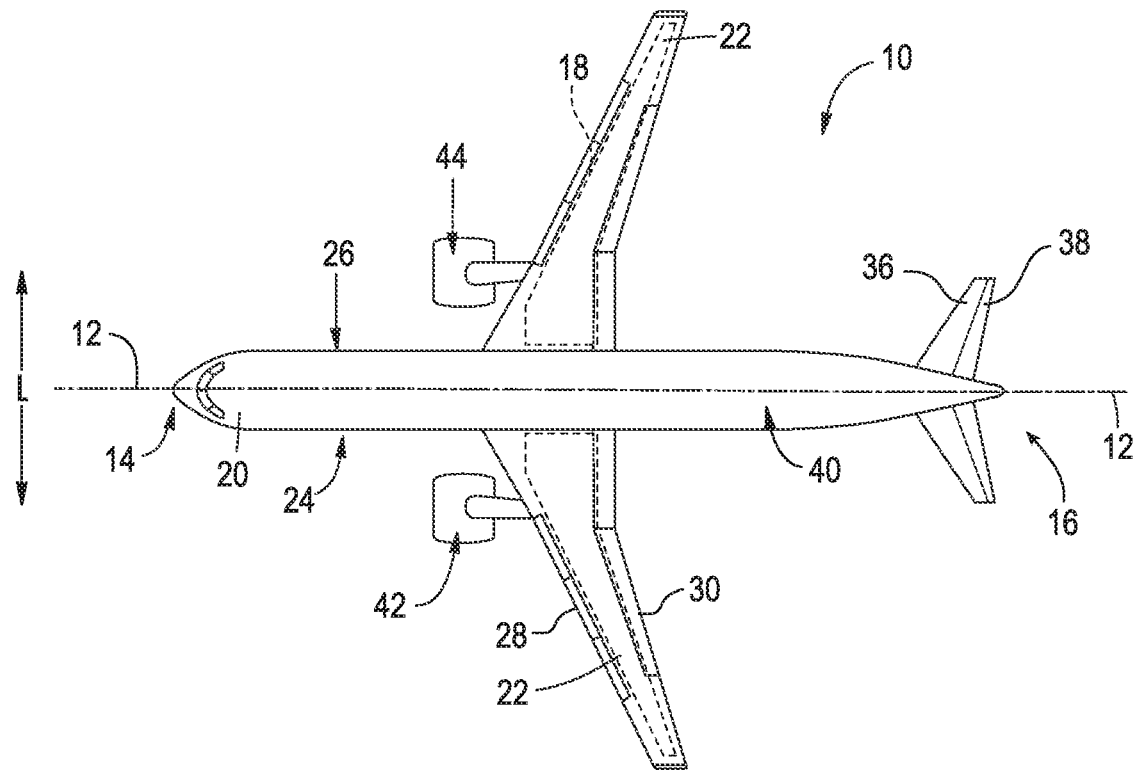
FIG. 1 is a top view of an aircraft in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Figure 2:
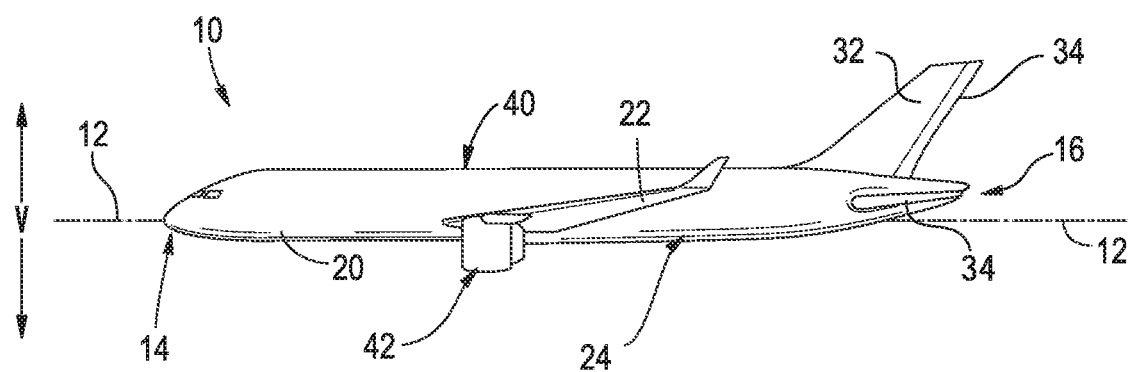
FIG. 2 is a port side view of the exemplary aircraft of FIG. 1.

Referring now to the drawings, wherein identical numerals indicate the same elements throughout the figures, FIG. 1 provides a top view of an exemplary aircraft 10 as may incorporate various embodiments of the present disclosure. FIG. 2 provides a port side 24 view of the aircraft 10 as illustrated in FIG. 1. As shown in FIGS. 1 and 2 collectively, the aircraft 10 defines a longitudinal centerline 12 that extends therethrough, a vertical direction V, a lateral direction L, a forward end 14, and an aft end 16.

Moreover, the aircraft 10 includes a fuselage 20, extending longitudinally from the forward end 14 of the aircraft 10 towards the aft end 16 of the aircraft 10, and a pair of wings 22. The first of such wings 22 extends laterally outwardly with respect to the longitudinal centerline 12 from the port side 24 of the fuselage 20 and the second of such wings 22 extends laterally outwardly with respect to the longitudinal centerline 12 from a starboard side 26 of the fuselage 20. As is depicted in phantom, each of the wings 22 for the exemplary embodiment depicted includes a fuel tank 18 housed therein. The exemplary aircraft 10 may further include one or more additional fuel tanks located elsewhere within, e.g., the fuselage 20 of the aircraft 10. Further, each of the wings 22 for the exemplary embodiment depicted includes one or more leading edge flaps 28 and one or more trailing edge flaps 30. The aircraft 10 further includes a vertical stabilizer 32 having a rudder flap 34 for yaw control, and a pair of horizontal stabilizers 36, each having an elevator flap 38 for pitch control. The fuselage 20 additionally includes an outer surface 40.

The exemplary aircraft 10 of FIGS. 1 and 2 also includes a propulsion system. The exemplary propulsion system includes a plurality of aircraft engines, at least one of which mounted to each of the pair of wings 22. Specifically, the plurality of aircraft engines includes a first aircraft engine 42 mounted to a first wing of the pair of wings 22 and a second aircraft engine 44 mounted to a second wing of the pair of wings 22. In at least certain exemplary embodiments, the aircraft engines 42, 44 may be configured as turbofan jet engines suspended beneath the wings 22 in an under-wing configuration. For example, in at least certain exemplary embodiments, the first and/or second aircraft engines 42, 44 may be configured in substantially the same manner as the exemplary turbofan jet engine 100 described below with reference to FIG. 3. Alternatively, however, in other exemplary embodiments any other suitable aircraft engine may be provided. For example, in other exemplary embodiments the first and/or second aircraft engines 42, 44 may alternatively be configured as turbojet engines, turboshaft engines, turboprop engines, etc.

Figure 3:
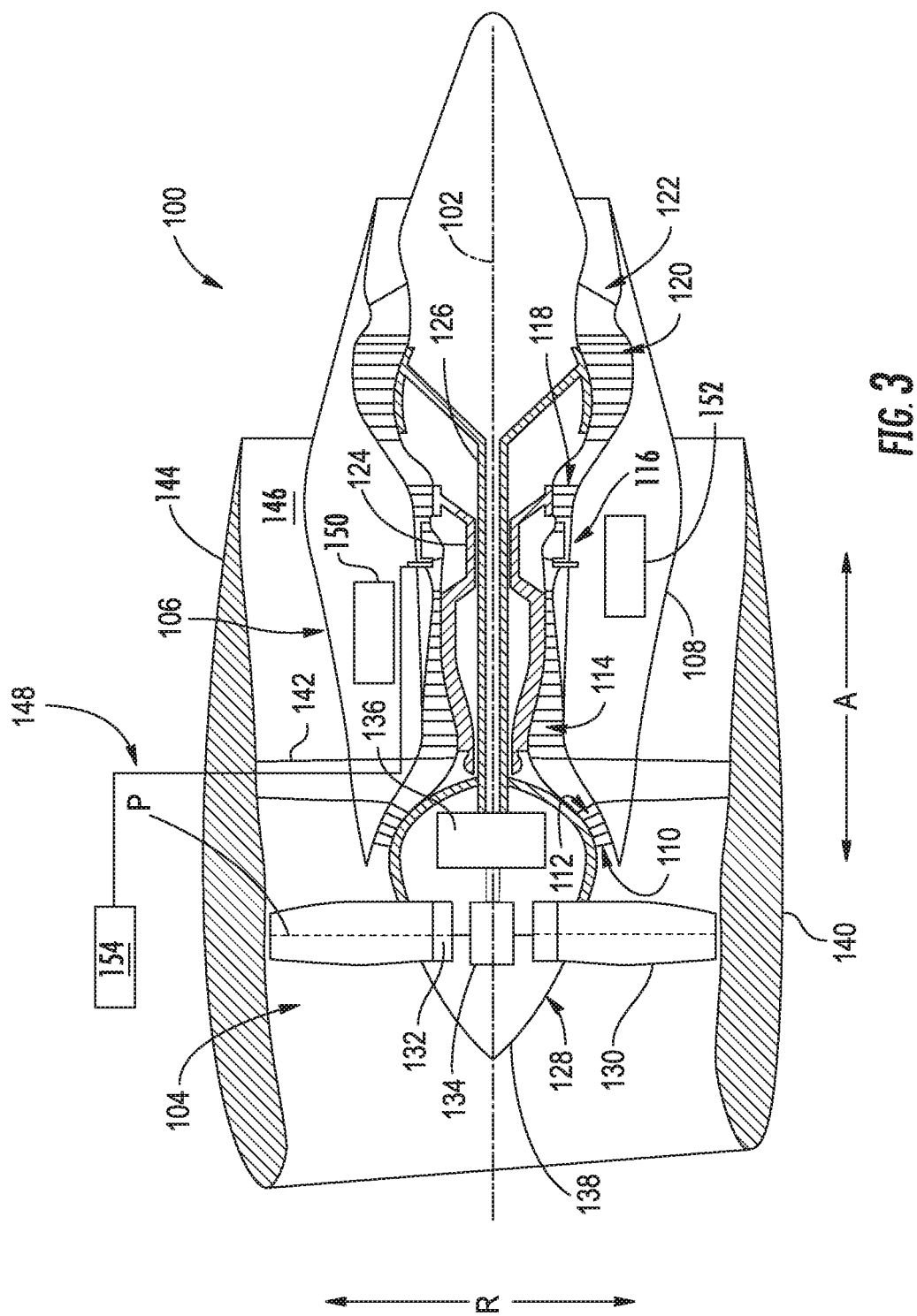
FIG. 3 is a schematic cross-sectional view of an exemplary gas turbine engine according to an exemplary embodiment of the present disclosure.

Referring now to FIG. 3, a schematic, cross-sectional view of an exemplary aircraft engine is provided. Specifically, for the embodiment depicted, the aircraft engine is configured as a high bypass turbofan jet engine, referred to herein as "turbofan engine 100." As discussed above, one or both of the first and/or second aircraft engines 42, 44 of the exemplary aircraft 10 described in FIGS. 1 and 2 may be configured in substantially the same manner as the exemplary turbofan engine 100 of FIG. 3.

As shown in FIG. 3, the turbofan engine 100 defines an axial direction A (extending parallel to a longitudinal centerline 102 provided for reference) and a radial direction R. In general, the turbofan 10 includes a fan section 104 and a core turbine engine 106 disposed downstream from the fan section 104.

The exemplary core turbine engine 106 depicted generally includes a substantially tubular outer casing 108 that defines an annular inlet 110. The outer casing 108 encases, in serial flow relationship, a compressor section including a booster or low pressure (LP) compressor 112 and a high pressure (HP) compressor 114; a combustion section 116; a turbine section including a high pressure (HP) turbine 118 and a low pressure (LP) turbine 120; and a jet exhaust nozzle section 122. A high pressure (HP) shaft or spool 124 drivingly connects the HP turbine 118 to the HP compressor 114. A low pressure (LP) shaft or spool 126 drivingly connects the LP turbine 120 to the LP compressor 112.

For the embodiment depicted, the fan section 104 includes a variable pitch fan 128 having a plurality of fan blades 130 coupled to a disk 132 in a spaced apart manner. As depicted, the fan blades 130 extend outwardly from disk 132 generally along the radial direction R. Each fan blade 130 is rotatable relative to the disk 132 about a pitch axis P by virtue of the fan blades 130 being operatively coupled to a suitable actuation member 134 configured to collectively vary the pitch of the fan blades 130 in unison. The fan blades 130, disk 132, and actuation member 134 are together rotatable about the longitudinal axis 12 by LP shaft 126 across a power gear box 136. The power gear box 136 includes a plurality of gears for adjusting the rotational speed of the fan 128 relative to the LP shaft 126 to a more efficient rotational fan speed.

Referring still to the exemplary embodiment of FIG. 3, the disk 132 is covered by rotatable front hub 138 aerodynamically contoured to promote an airflow through the plurality of fan blades 130. Additionally, the exemplary fan section 104 includes an annular fan casing or outer nacelle 140 that circumferentially surrounds the fan 128 and/or at least a portion of the core turbine engine 106. It should be appreciated that the nacelle 140 may be configured to be supported relative to the core turbine engine 106 by a plurality of circumferentially-spaced outlet guide vanes 142. Moreover, a downstream section 144 of the nacelle 140 may extend over an outer portion of the core turbine engine 106 so as to define a bypass airflow passage 146 therebetween.

The turbofan engine 100 may additionally be operable with one or more auxiliary systems to allow for proper operation of the turbofan engine 100 and/or an aircraft (e.g., aircraft 10) to which the turbofan engine 100 is incorporated. More specifically, for the embodiment depicted, the exemplary turbofan engine 100 is operable with a fuel system 148, a main lubrication oil system 150, and a variable frequency generator 152. The exemplary fuel system 148 depicted is in flow communication with a fuel tank 154 (which may be configured in substantially the same manner as the exemplary fuel tank 18 of FIGS. 1 and 2), and is configured to provide fuel from the fuel tank 154 to a combustor of the exemplary combustor section 116 of the turbofan engine 100. Additionally, the exemplary main lubrication oil system 150 is configured to provide lubrication oil to various rotating parts or components of the turbofan engine 100. For example, the main lubrication oil system 150 may recirculate a lubrication oil through the engine to provide an amount of lubrication oil to various gears (e.g., within the power gearbox 136), bearings (e.g., various bearings supporting rotation of the fan 128, the LP shaft 126, and/or the HP shaft 124), and/or other rotating components. The main lubrication oil system 150 further removes an amount of heat from each of these components. Moreover, the variable frequency generator 152 may be configured as an electric generator driven by, e.g., an accessory gearbox (not shown) of the turbofan engine 100, for generating electrical power at various rotational speeds.

It should be appreciated, however, that the exemplary turbofan engine 100 depicted in FIG. 3 is by way of example only, and that in other exemplary embodiments, the turbofan engine 100 may have any other suitable configuration, including, e.g., any suitable number of shafts or spools, compressors, and/or turbines. Additionally, in other exemplary embodiments, the turbofan engine 100 may instead be configured as any other suitable gas turbine engine, such as a turboshaft engine, turboprop engine, turbojet engine, etc.

Figure 4:
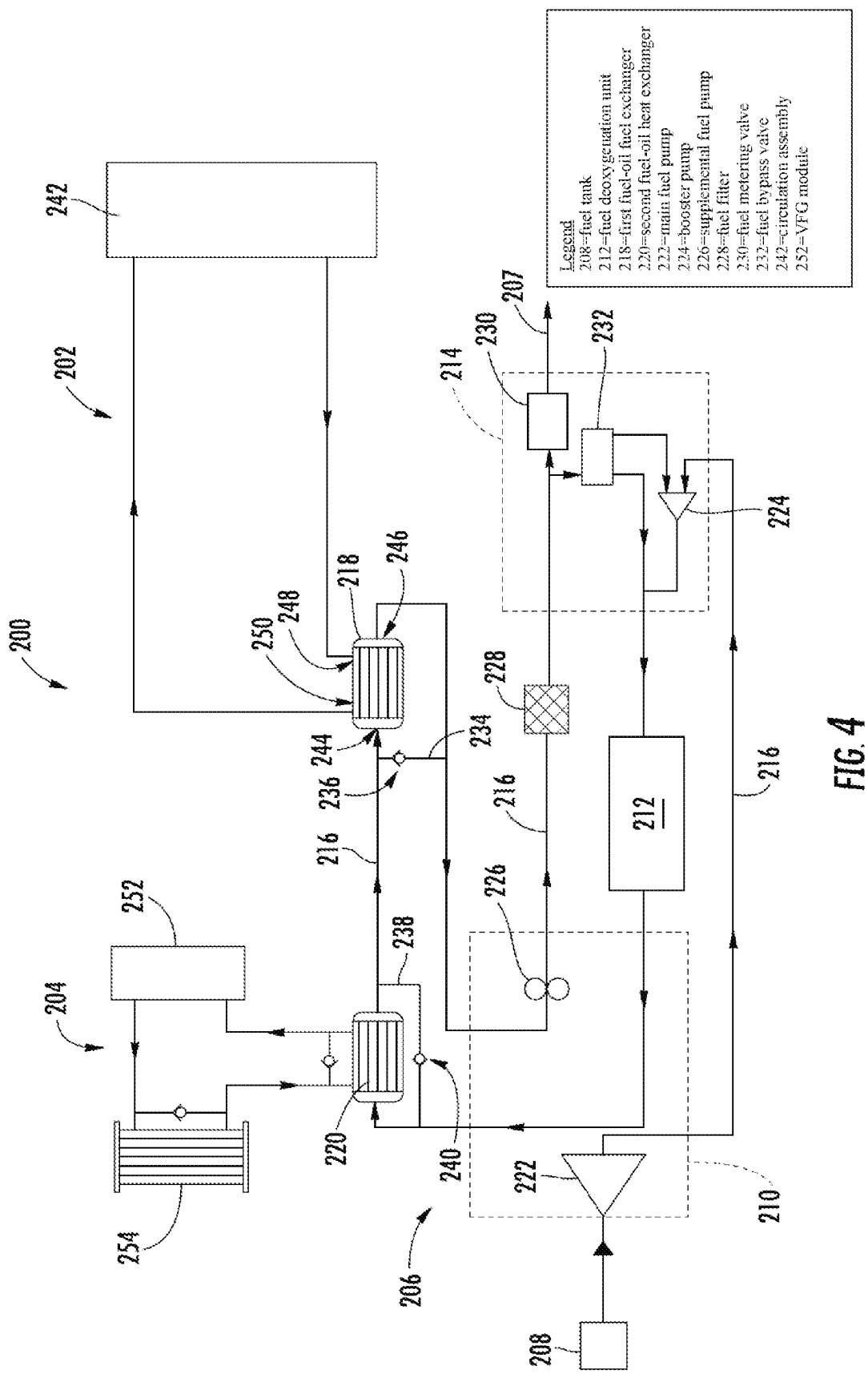
FIG. 4 is a schematic view of an exemplary system for managing thermal transfer in accordance with an exemplary embodiment of the present disclosure.

Referring now to FIG. 4, a schematic view is provided of a system 200 for managing thermal transfer in at least one of an aircraft or a gas turbine engine. For example, the exemplary system 200 depicted may manage thermal transfer in the exemplary aircraft 10 depicted in FIGS. 1 and 2, and/or the exemplary gas turbine engine 100 depicted in FIG. 3.

The exemplary system 200 of FIG. 4 generally includes a first engine system 202, a second engine system 204, and a fuel system 206. The fuel system 206 is configured for providing fuel to a combustor of the gas turbine engine via an outlet line 207, similar to the exemplary fuel system 148 depicted in FIG. 3. Accordingly, the exemplary fuel system 206 generally includes a fuel tank 208 (which may be configured as the exemplary fuel tank 18 described above with reference to FIG. 1), a fuel pump unit 210, a deoxygenation unit 212, and a fuel metering unit 214. The fuel pump unit 210 is in fluid communication with the fuel tank 208 at a location downstream of the fuel tank 208 for generating a flow of fuel through one or more fuel lines 216. Additionally, the deoxygenation unit 212 is in fluid communication with the fuel pump unit 210 at a location downstream of the fuel pump unit 210 for deoxygenating fuel in the fuel system 206. Deoxygenating fuel in the fuel system 206 may reduce a formation of insoluble products referred to as "coke" in the fuel when the fuel is heated above certain thresholds. Coke forms when hydrocarbon fuel containing oxygen is heated beyond a certain temperature (e.g. above 250° F. or 121° C.). Coke deposits within the fuel may limit a lifespan of certain components within the fuel system 206 and degrade engine performance by, e.g., clogging certain fuel nozzles.

The exemplary fuel system 206 additionally includes a fuel-oil heat exchanger located downstream of the deoxygenation unit 212 and in thermal communication with the fuel in the fuel system 206. More particularly, the exemplary fuel system 206 depicted includes a first fuel-oil heat exchanger 218 operable with the first engine system 202 and a second fuel-oil heat exchanger 220 operable with the second engine system 204. Accordingly, during operation of the fuel system 206 of FIG. 4, fuel may be provided from the fuel tank 208 through the fuel pump unit 210 and to the fuel metering unit 214. Specifically, for the embodiment depicted, fuel is pumped through a main fuel pump 222 of the fuel pump unit 210 through the fuel lines 216 to and through a booster pump 224 within the fuel metering unit 214. Fuel is then provided to the deoxygenation unit 212 wherein the fuel is deoxygenated. The deoxygenated fuel, for the exemplary system 200 depicted, is then provided to the second fuel-oil heat exchanger 220 wherein an amount of heat is transferred from the second engine system 204 to the deoxygenated fuel, and subsequently the fuel is provided to the first fuel-oil heat exchanger 218, wherein an additional amount of heat is transferred from the first engine system 202 to the deoxygenated fuel. As is depicted, a supplemental fuel pump 226 of the fuel pump unit 210 subsequently increases a pressure of the heated and deoxygenated fuel and provides a flow of such fuel through a fuel filter 228 before the fuel is provided back to the fuel metering unit 214. Within the fuel metering unit 214, the fuel is either provided via a fuel metering valve 230 to, e.g., a combustor of the gas turbine engine, or through fuel bypass valve 232, wherein such fuel recirculates back through the fuel system 206.

The exemplary system 200 of FIG. 4 additionally includes a plurality of bypass lines for bypassing one or both of the first fuel-oil heat exchanger 218 and the second fuel-oil heat exchanger 220. Specifically, the exemplary system 200 depicted includes a first bypass line 234 having a first one-way bypass valve 236 for bypassing the first fuel-oil heat exchanger 218 and a second bypass line 238 having a second one-way bypass valve 240 for bypassing the second fuel-oil heat exchanger 220. Although not depicted, the exemplary system 200 may additionally include three-way valves at junctures between the respective bypass lines 234, 238 and fuel lines 216 for diverting a flow of fuel in the fuel lines 216 through such bypass lines 234, 238 when bypass of the first fuel-oil heat exchanger 218 and/or second fuel-oil heat exchanger 220 is desired.

Referring still to the embodiment of FIG. 4, the first engine system 202 is configured as a main lubrication oil system of a gas turbine engine (similar to the main lubrication oil system 150 of the exemplary turbofan engine 100 of FIG. 3). The main lubrication oil system utilizes a high temperature oil for heat transfer, as well as to provide lubrication to various bearings and other rotating parts within the gas turbine engine. The high temperature oil may be any suitable oil capable of withstanding the elevated temperatures of the exemplary system 200 depicted. For example, the high temperature oil may be any suitable oil having a temperature limit of at least about 500 degrees Fahrenheit (° F.). Alternatively, the high temperature oil may instead have a temperature limit of at least about 550° F. It should be appreciated, that as used herein, terms of approximation, such as "about" or "approximately," refer to being within a 10% margin of error. Additionally, as used herein, the "temperature limit" of the oil refers to a temperature at which the oil begins coking, vaporizing, or otherwise deteriorating under operational pressures.

Moreover, the oil may be a liquid at relatively low temperatures, such that the oil is not required to be preheated. More specifically, the oil may define a pour temperature of less than about 0° F., such as less than about −10° F., such as less than about −25° F., such as less than about −40° F. As used herein, the "pour temperature" refers to a temperature which the oil becomes semisolid and loses its flow characteristics.

More particularly, in certain exemplary embodiments the high temperature oil may be an ionic liquid, or an ionic liquid blend. Ionic liquids possess virtually no vapor pressure. Therefore, in use, they generally present a low risk of atmospheric contamination and have no odour. Further, ionic liquids are generally non-flammable, thermally stable and liquid over a wide range of temperatures. However, in other embodiments, the high temperature oil may be any other suitable oil.

The exemplary main lubrication oil system of FIG. 4 may generally include a circulation assembly 242 for circulating the oil through the various components of the engine. More particularly, in at least certain exemplary embodiments, the circulation assembly 242 of the main lubrication oil system may include an oil pump, one or more oil supply lines, a scavenge pump, and one or more oil scavenge lines. Additionally, as is discussed above, the main lubrication oil system is operable with the first fuel-oil heat exchanger 218 for transferring heat from the oil within the main lubrication oil system to the fuel the fuel system 206. The exemplary first fuel-oil heat exchanger 218 may accordingly be in fluid communication with, e.g., the circulation assembly 242 of the main lubrication oil system.

As stated, for the embodiment depicted the exemplary main lubrication oil system utilizes a high temperature oil for heat transfer. Additionally, given the position of the fuel deoxygenation unit 212 upstream of the first fuel-oil heat exchanger 218, the fuel within the fuel system 206 is capable of receiving a relatively high amount of heat from the main lubrication oil system. For example, during operation of a gas turbine engine within which the main lubrication oil system is integrated, the first fuel-oil heat exchanger 218 may define a fuel inlet temperature $T_{F1}$ at a fuel inlet 244, a fuel outlet temperature $T_{F2}$ at a fuel outlet 246, an oil inlet temperature $T_{O1}$ at an oil inlet 248, and an oil outlet temperature $T_{O2}$ at an oil outlet 250. In certain exemplary embodiments, the fuel inlet temperature $T_{F1}$ may be up to about 200° F., the fuel outlet temperature $T_{F2}$ may be between about 450° F. and about 600° F., the oil inlet temperature $T_{O1}$ may be between about 450° F. and about 600° F., and the oil outlet temperature $T_{O2}$ may be up to about 250° F. Accordingly, with such an exemplary embodiment, the exemplary first fuel-oil heat exchanger 218 may receive a relatively large amount of heat from the main lubrication oil system during operation of the gas turbine engine.

Referring still to the exemplary embodiment of FIG. 4 the exemplary second engine system 204 is configured as an electric generator system also utilizing a high temperature oil for heat transfer. More particularly, for the embodiment depicted the exemplary second engine system 204 is configured as a variable frequency generator (VFG) system (similar to the VFG 152 discussed above with reference to FIG. 3) utilizing a high temperature oil for heat transfer. The exemplary VFG system generally includes a VFG module 252 and an air-oil heat exchanger 254. Moreover, as is depicted, the second fuel-oil heat exchanger 220 is in thermal communication with the oil from the VFG system and the fuel from the fuel system 206 for removing heat from the VFG system and transferring such heat to the fuel. Notably, the high temperature oil within/utilized by the VFG system may be the same or substantially similar to the exemplary high temperature oil utilized by the first engine system 202 (e.g., main lubrication oil system). Accordingly, the exemplary high temperature oil utilized by the VFG system may have a temperature limit of at least about 500° F., such as at least about 550° F. Alternatively, however, in other exemplary embodiments, the VFG system may utilize any other suitable high temperature oil, or alternatively may utilize any other suitable oil, such as an oil having a temperature limit of less than about 500° F.

For the embodiment depicted, the air-oil heat exchanger 254 of the VFG system is located upstream of the second fuel-oil heat exchanger 220 of the fuel system 206. The air-oil heat exchanger 254 of the VFG system may be in airflow communication with, e.g., a flow of air from a fan of the turbofan engine. It should be appreciated, however, that in other exemplary embodiments, the air-oil heat exchanger of the VFG system may instead be positioned downstream of the second fuel-oil heat exchanger 220 of the fuel system 206, or alternatively, may not be included at all.

As shown, and as described above, the fuel in the fuel system 206 is configured to receive the total amount of heat from one or more heat exchangers (i.e., the first fuel-oil heat exchanger 218 and second fuel-oil heat exchanger 220 for the embodiment depicted) located between the fuel tank 208 and the outlet line 207. For the embodiment depicted, each of the one or more heat exchangers are configured as fuel-oil heat exchangers, such that no fuel-air heat exchangers art utilized for adding or removing heat from the fuel within the fuel system 206. Accordingly, such may result in a safer overall system 200, as a leak in a fuel-air heat exchanger may result in an undesirable pressurized fuel-air combination.

It should be appreciated, however, that the exemplary system 200 depicted in FIG. 4 is provided by way of example only. In other exemplary embodiments, the system 200 may have any other suitable configuration. For example, in other exemplary embodiments, the second engine system 204 may be any other suitable generator, or other engine system, or further the exemplary system 200 depicted may not include the second engine system 204 (e.g., the VFG system) and second fuel-oil heat exchanger 220. Alternatively, the second fuel-oil heat exchanger 220 may instead be located downstream of the first fuel-oil heat exchanger 218 and/or may instead be in thermal communication with any other suitable engine system. Further, in other exemplary embodiments, the exemplary system 200 depicted may include additional fuel-oil heat exchangers in thermal communication with other engine systems. Further, the exemplary system 200 depicted may utilize any other suitable fuel pump unit 210 and/or fuel metering unit 214. Further, one or both of the fuel pump unit 210 and the fuel metering unit 214 may be in communication with a controller (not shown) of the gas turbine engine and/or of an aircraft in which the gas turbine engine is installed for controlling operation of the fuel pump unit 210 and/or the fuel metering unit 214.

Figure 5:
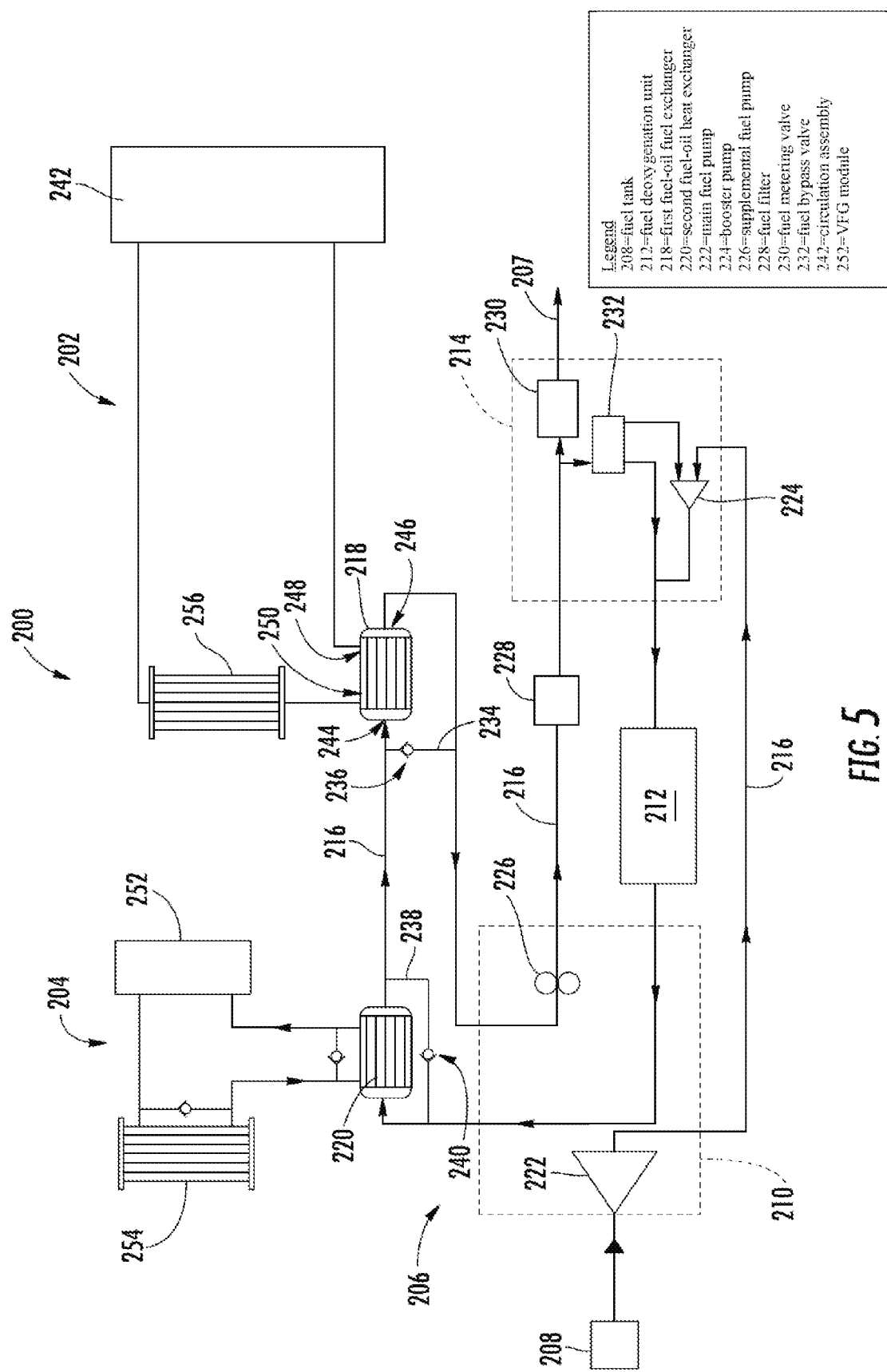
FIG. 5 is a schematic view of another exemplary system for managing thermal transfer in accordance with an exemplary embodiment of the present disclosure.

Furthermore, referring now to FIG. 5, providing another embodiment of the exemplary system 200 of FIG. 4, the first engine system 202/exemplary main lubrication oil system may have any other suitable configuration. The exemplary system 200 of FIG. 5 is configured in substantially the same manner as exemplary system 200 of FIG. 4. The exemplary system 200 of FIG. 5, accordingly generally includes a fuel system 206; a first engine system 202 operable with a first fuel-oil heat exchanger 218 of the fuel system 206, the first engine system 202 for the embodiment depicted being configured as a main lubrication oil system; and a second engine system 204 operable with a second fuel-oil heat exchanger 220 of the fuel system 206, the second engine system 204 for the embodiment depicted being configured as a VFG system.

Notably, however, for the embodiment depicted, the exemplary main lubrication oil system additionally includes an air-oil heat exchanger 256. The air-oil heat exchanger 256 is in thermal communication with the oil flowing through the main lubrication oil system for removing an amount of heat from the main lubrication oil system. The air-oil heat exchanger 256 may receive a flow of air from, e.g., a fan of an exemplary gas turbine engine to provide such heat transfer. For the embodiment depicted, the exemplary air-oil heat exchanger 256 is located downstream of the fuel-oil heat exchanger of the fuel system 206. Accordingly, for the embodiment depicted, a majority of heat transfer from the main lubrication oil system occurs between the main lubrication oil system and the fuel system 206 via the first fuel-oil heat exchanger 218.

However, in other exemplary embodiments, the air-oil heat exchanger 256 may instead be positioned upstream of the fuel-oil heat exchanger 218 of the fuel system 206, and moreover, in still other exemplary embodiments, the main lubrication oil system may additionally, or alternatively, include any other suitable heat exchangers.

Furthermore, in still other exemplary embodiments, the exemplary first and second engine systems 202, 204 may, e.g., be in fluid and/or thermal communication with one another. For example, referring now to FIGS. 6 and 7, providing other exemplary embodiments of the exemplary system 200, the first engine system 202 is depicted in selective thermal communication with the second engine system 204.

Figure 6:
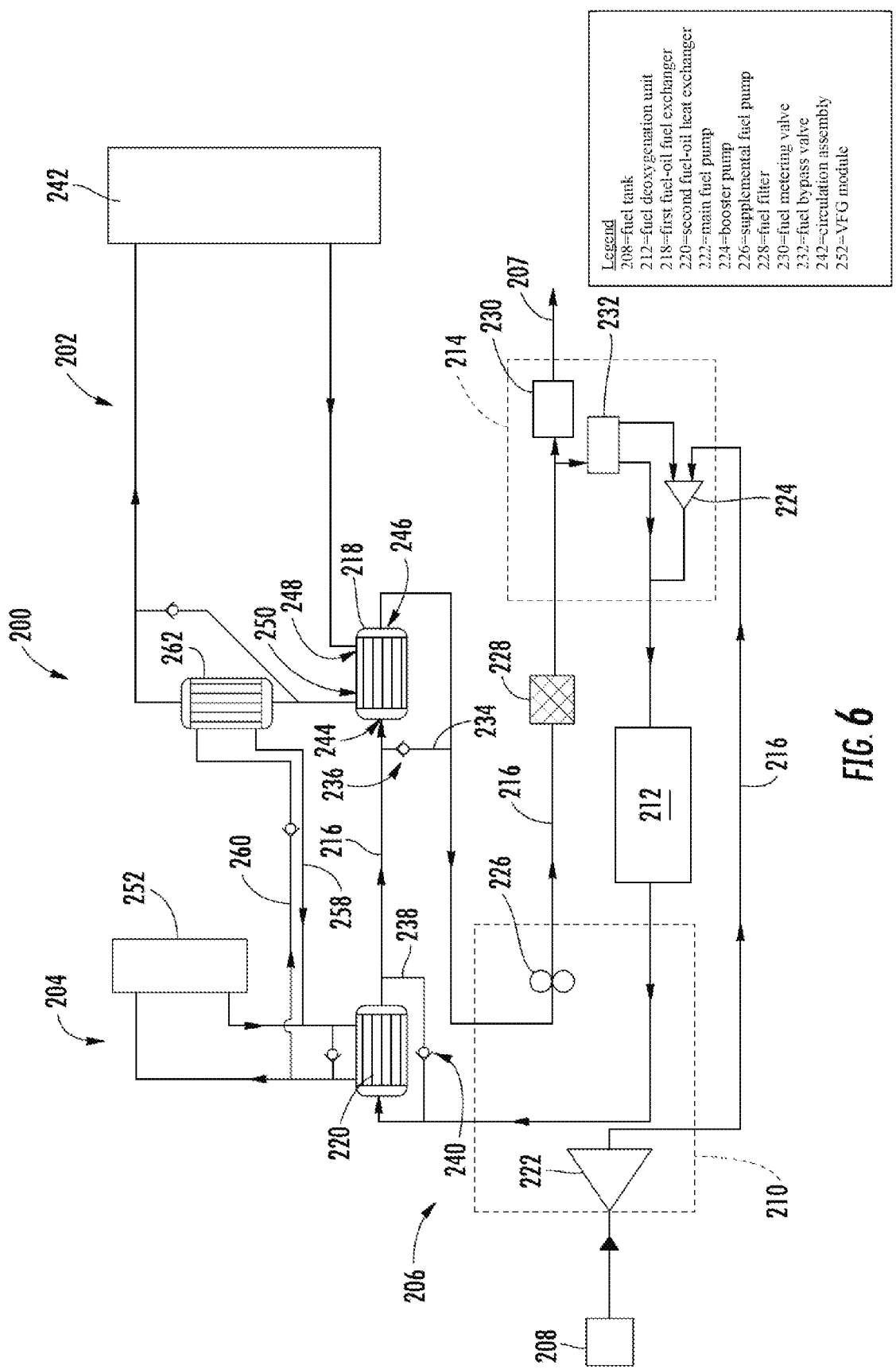
FIG. 6 is a schematic view of yet another exemplary system for managing thermal transfer in accordance with an exemplary embodiment of the present disclosure.
Figure 7:
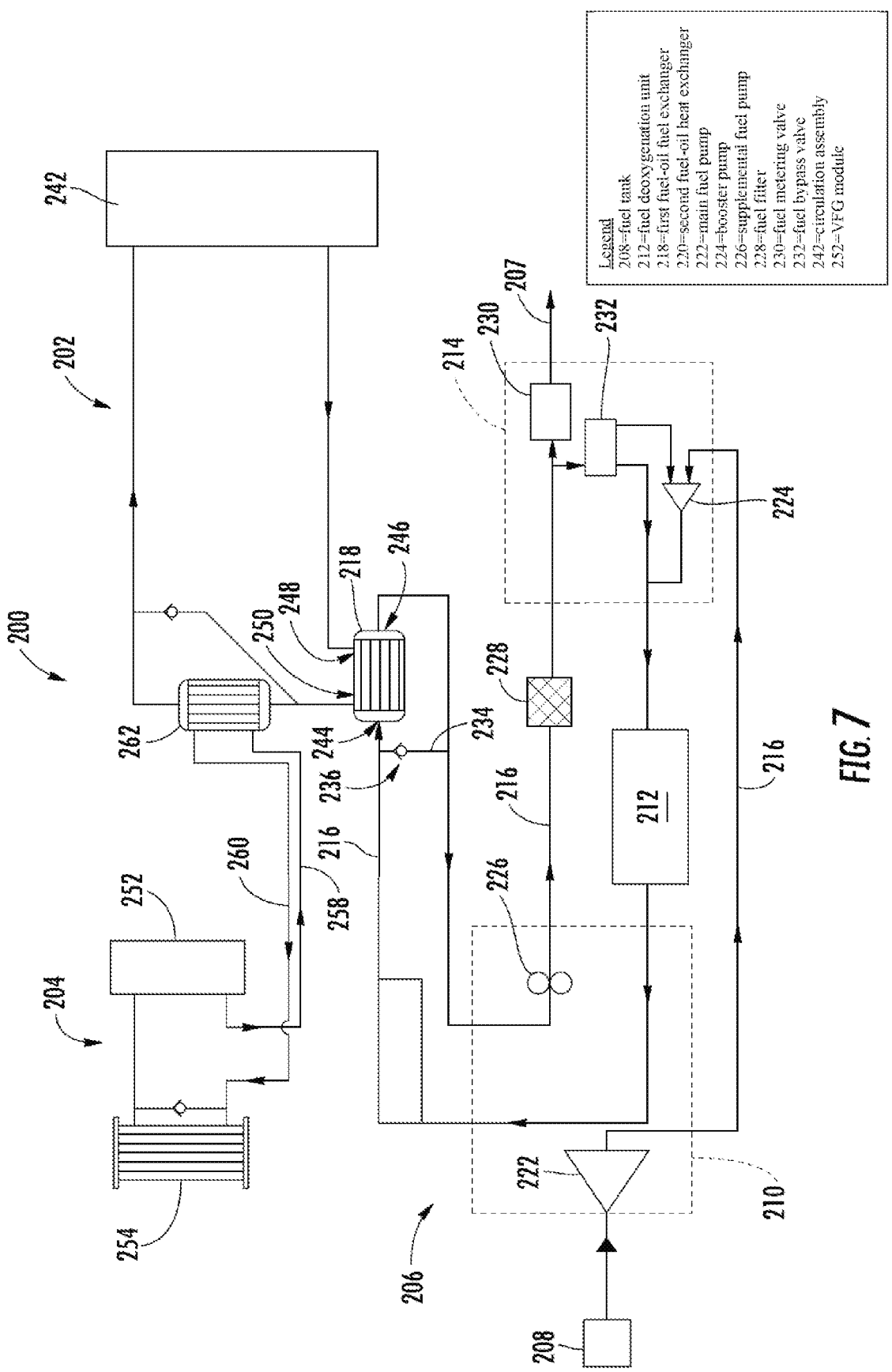
FIG. 7 is a schematic view of still another exemplary system for managing thermal transfer in accordance with an exemplary embodiment of the present disclosure.

The exemplary system 200 of FIGS. 6 and 7 may be configured in substantially the same manner as exemplary system 200 of FIG. 4. For example, referring particularly to FIG. 6, the exemplary system 200 generally includes a fuel system 206; a first engine system 202 operable with a first fuel-oil heat exchanger 218 of the fuel system 206, the first engine system 202 for the embodiment depicted being configured as a main lubrication oil system; and a second engine system 204 operable with a second fuel-oil heat exchanger 220 of the fuel system 206, the second engine system 204 for the embodiment depicted being configured as a VFG system.

However, for the embodiment of FIG. 6, the main lubrication oil system is in selective thermal communication with the VFG system. More particularly, a first transfer line 258 extends between the main lubrication oil system (at a location downstream of the second fuel-oil heat exchanger 220) and the VFG system (at a location upstream of the first fuel-oil heat exchanger 218). Additionally, a second transfer line 260 extends between the VFG system (at a location downstream of the first fuel-oil heat exchanger 218) and the main lubrication oil system (at a location downstream of the second fuel-oil heat exchanger 220 and first transfer line 258). Further, an oil-oil heat exchanger 262 is positioned to selectively thermally connect the main lubrication oil system and the VFG system.

Such a configuration may allow for the main lubrication oil system to additionally utilize the second fuel-oil heat exchanger 220 of the fuel system 206 to remove heat from the main locational oil system and provide such heat to the fuel within the fuel system 206. For example, in certain exemplary aspects, such as during certain operating conditions of the gas turbine engine, the VFG system may not generate a large amount of heat required to be removed from the VFG system. Accordingly, the exemplary main lubrication oil system may thermally connect to the VFG system via the first and second transfer lines 258, 260 and oil-oil heat exchanger 262. The relatively cool oil having passed through the second heat exchanger may be provided to the oil-oil heat exchanger 262 via line 260 to remove an amount of heat from the oil in the main lubrication oil system. After having received the heat from the main lubrication oil system, the oil may then be provided back to the VFG system via line 258 (wherein such oil is provided back through heat exchanger 220). Such a configuration may allow for the exemplary system 200 to better utilize all of the available heat transfer resources available.

Referring now particularly to FIG. 7, the exemplary system 200 generally includes a fuel system 206; a first engine system 202 operable with a first fuel-oil heat exchanger 218 of the fuel system 206, the first engine system 202 for the embodiment depicted being configured as a main lubrication oil system; and a second engine system 204, the second engine system 204 for the embodiment depicted being configured as a VFG system. For the embodiment of FIG. 7, the main lubrication oil system is again in selective thermal communication with the VFG system. More particularly, a first transfer line 258 and a second transfer line 260 each extend between the main lubrication oil system and the VFG system. Further, an oil-oil heat exchanger 262 is positioned to selectively thermally connect the main lubrication oil system and the VFG system.

Such a configuration may allow for the main lubrication oil system to additionally utilize the air-oil heat exchanger 254 of the fuel system 206 to remove heat from the main lubrication oil system. For example, in certain exemplary aspects, such as during certain operating conditions of the gas turbine engine, the VFG system may not generate a large amount of heat required to be removed from the VFG system. Accordingly, the exemplary main lubrication oil system may thermally connect to the VFG system via the first and second transfer lines 258, 260 and oil-oil heat exchanger 262. The relatively cool oil of the VFG system may be provided to the oil-oil heat exchanger 262 via line 258 to remove an amount of heat from the oil in the main lubrication oil system. After having received the heat from the main lubrication oil system, the oil may then be provided back to the VFG system via line 260, wherein such oil is provided through the heat exchanger 254. Such a configuration may allow for the exemplary system 200 to better utilize all of the available heat transfer resources available.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for managing thermal transfer in at least one of an aircraft or a gas turbine engine, the system comprising:
a first engine system comprising a high temperature oil comprising an ionic liquid or an ionic liquid blend for heat transfer; and
a fuel system, the fuel system comprising:
a deoxygenation unit for deoxygenating a fuel in the fuel system;
a fuel-oil heat exchanger in flow communication with the deoxygenation unit and in thermal communication with both the high temperature oil in the first engine system and the fuel in the fuel system for transferring heat from the high temperature oil in the first engine system to the fuel in the fuel system;
a supplemental fuel pump in flow communication with the fuel-oil heat exchanger for increasing a pressure of the fuel; and
a fuel metering unit comprising a fuel bypass valve, a fuel metering valve, and a booster pump,
wherein the fuel bypass valve is positioned at least partially upstream of the deoxygenation unit,
wherein the fuel metering unit is located downstream of the supplemental fuel pump and is configured to split substantially all of the fuel after being heated and deoxygenated for delivery to one of a combustor and the fuel bypass valve,
wherein the fuel bypass valve is configured to send a first portion of the fuel after being heated and deoxygenated to the deoxygenation unit through a first bypass conduit and a second portion of the fuel after being heated and deoxygenated to the booster pump through a second bypass conduit.

2. The system of claim 1, wherein the first engine system is a main lubrication oil system of the gas turbine engine, the main lubrication oil system recirculating the high temperature oil utilized for the heat transfer.

3. The system of claim 2, further comprising
a second engine system utilizing a second oil for heat transfer,
wherein the fuel-oil heat exchanger of the fuel system is a first fuel-oil heat exchanger,
wherein the fuel system further comprises a second fuel-oil heat exchanger,
wherein the second fuel-oil heat exchanger is in thermal communication with the second oil from the second engine system and the fuel from the fuel system for removing heat from the second engine system.

4. The system of claim 2,
wherein a second engine system is a variable frequency generator system, and
wherein a second oil utilized by the variable frequency generator system has a temperature limit between about 500 degrees Fahrenheit (F) and about 550 degrees F.

5. The system of claim 3, wherein the main lubrication system is in selective thermal communication with the second engine system.

6. The system of claim 1,
wherein the fuel system comprises a fuel tank and an outlet line extending to the combustor of the gas turbine engine,
wherein the fuel in the fuel system is configured to receive the heat from the fuel-oil heat exchanger which is located between the fuel tank and the outlet line.

7. The system of claim 6, wherein the fuel in the fuel system is configured to receive a total amount of heat from the fuel-oil heat exchanger and another fuel-oil heat exchanger located between the fuel tank and the outlet line.

8. The system of claim 1,
wherein during operation of the gas turbine engine the fuel-oil heat exchanger defines a fuel inlet temperature, a fuel outlet temperature, an oil inlet temperature, and an oil outlet temperature, wherein the fuel inlet temperature is up to about 200 degrees Fahrenheit (F),
wherein the fuel outlet temperature is between about 450 degrees F. and about 600 degrees F.,
wherein the oil inlet temperature is between about 450 degrees F. and about 600 degrees F., and
wherein the oil outlet temperature is up to about 250 degrees F.

9. The system of claim 1, wherein the first engine system includes an air-oil heat exchanger located immediately upstream of the fuel-oil heat exchanger.

10. The system of claim 1, wherein the fuel-oil heat exchanger is in flow communication with the deoxygenation unit at a location downstream of the deoxygenation unit.

11. The system of claim 1, wherein the supplemental fuel pump in flow communication with the fuel-oil heat exchanger at a location downstream of the fuel-oil heat exchanger.

12. The system of claim 1, wherein the high temperature oil has a temperature limit of at least about 500 degrees Fahrenheit (F) and has a pour temperature of less than zero degrees F.

13. A system for managing thermal transfer, the system comprising:
a gas turbine engine;
a main lubrication oil system operable with the gas turbine engine for providing the gas turbine engine with a lubrication oil comprising an ionic liquid or an ionic liquid blend; and
a fuel system, the fuel system comprising:
a deoxygenation unit for deoxygenating a fuel in the fuel system; and
a fuel-oil heat exchanger in flow communication with the deoxygenation unit and in thermal communication with the lubrication oil in the main lubrication oil system, the fuel-oil heat exchanger, during operation of the gas turbine engine, defining a fuel inlet temperature, a fuel outlet temperature, an oil inlet temperature, and an oil outlet temperature, the fuel inlet temperature being up to about 200 degrees Fahrenheit (F), the fuel outlet temperature being between about 450 degrees F. and about 600 degrees F., the oil inlet temperature being between about 450 degrees F. and about 600 degrees F., and the oil outlet temperature being up to about 250 degrees F.;
a supplemental fuel pump in flow communication with the fuel-oil heat exchanger for increasing the pressure of the fuel; and
a fuel metering unit comprising a fuel bypass valve, a fuel metering valve, and a booster pump,
wherein the fuel bypass valve is positioned at least partially upstream of the deoxygenation unit,
wherein the fuel metering unit is located downstream of the supplemental fuel pump and is configured to split substantially all of the fuel after being heated and deoxygenated for delivery to one of a combustor and the fuel bypass valve,
wherein the fuel bypass valve sending a first portion of the fuel after being heated and deoxygenated to the deoxygenation unit through a first bypass conduit and a second portion of the fuel after being heated and deoxygenated to the booster pump through a second bypass conduit.

14. The system of claim 13, further comprising
a second engine system utilizing a second oil for heat transfer,
wherein the fuel-oil heat exchanger of the fuel system is a first fuel-oil heat exchanger,
wherein the fuel system further comprises a second fuel-oil heat exchanger,
wherein the second fuel-oil heat exchanger is in thermal communication with the second oil from the second engine system and the fuel from the fuel system for removing heat from the second engine system.

15. The system of claim 14, wherein the main lubrication oil system is in selective thermal communication with the second engine system.

16. The system of claim 13, wherein the lubrication oil utilized by the main lubrication oil system defines a pour temperature between zero degrees F. and about minus 40 degrees F.

17. A method for operating a system for managing thermal transfer, the method comprising:
operating a gas turbine engine, a main lubrication oil system operable with the gas turbine engine for providing the gas turbine engine with a lubrication oil comprising an ionic liquid or an ionic liquid blend, and a fuel system, the fuel system comprising a deoxygenation unit for deoxygenating a fuel in the fuel system, and a fuel-oil heat exchanger in flow communication with the deoxygenation unit and in thermal communication with the lubrication oil in the main lubrication oil system; and
providing the fuel to a fuel inlet of the fuel-oil heat exchanger at a temperature of up to about 200 degrees Fahrenheit (F);
providing the fuel to a fuel outlet of the fuel-oil heat exchanger at a temperature between about 450 degrees F. and about 600 degrees F.;
providing the lubrication oil to an oil inlet of the fuel-oil heat exchanger between about 450 degrees F. and about 600 degrees F.; and
providing the lubrication oil to an oil outlet of the fuel-oil heat exchanger up to about 250 degrees F.,
wherein the fuel system further comprises:
a supplemental fuel pump in flow communication with the fuel-oil heat exchanger for increasing the pressure of the fuel; and
a fuel metering unit comprising a fuel bypass valve, a fuel metering valve, and a booster pump,
wherein the fuel bypass valve is positioned at least partially upstream of the deoxygenation unit,
wherein the fuel metering unit is located downstream of the supplemental fuel pump and splits substantially all of the fuel after being heated and deoxygenated for delivery to one of a combustor and the fuel bypass valve, and
wherein the fuel bypass valve sends a first portion of the fuel after being heated and deoxygenated to the deoxygenation unit through a first bypass conduit and a second portion of the fuel after being heated and deoxygenated to the booster pump through a second bypass conduit.

* * * * *